(12) United States Patent
Lee et al.

(10) Patent No.: US 10,249,230 B2
(45) Date of Patent: Apr. 2, 2019

(54) METHOD OF IMAGE PROCESSING, IMAGE PROCESSOR PERFORMING THE METHOD, AND DISPLAY DEVICE INCLUDING THE IMAGE PROCESSOR

(71) Applicant: Samsung Display Co., LTD., Yongin-si, Gyeonggi-Do (KR)

(72) Inventors: Hyun-Dae Lee, Yongin-si (KR); Eun-Ho Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 237 days.

(21) Appl. No.: 15/019,209

(22) Filed: Feb. 9, 2016

(65) Prior Publication Data

US 2017/0032732 A1    Feb. 2, 2017

(30) Foreign Application Priority Data

Jul. 30, 2015   (KR) .................. 10-2015-0107979

(51) Int. Cl.

| | |
|---|---|
| *G06T 11/60* | (2006.01) |
| *G06T 3/40* | (2006.01) |
| *H04N 1/60* | (2006.01) |
| *G09G 3/20* | (2006.01) |
| *G09G 5/391* | (2006.01) |

(52) U.S. Cl.
CPC ......... *G09G 3/2092* (2013.01); *G06T 3/4038* (2013.01); *G06T 11/60* (2013.01); *G09G 5/391* (2013.01); *H04N 1/6005* (2013.01); *G09G 2310/04* (2013.01); *G09G 2320/0233* (2013.01); *G09G 2320/066* (2013.01); *G09G 2340/06* (2013.01); *G09G 2340/10* (2013.01); *G09G 2360/12* (2013.01); *G09G 2360/16* (2013.01)

(58) Field of Classification Search
CPC ..... G06T 11/001; G06T 11/60; G06T 15/005; G06T 5/40; G06T 3/4038; G06T 2207/20021; G09G 5/02; G09G 5/14; G09G 2320/0626; G09G 2320/0233; G09G 2360/16; H04N 5/57; H04N 1/6005
USPC ....... 345/581, 589, 604, 619, 629, 634, 643; 382/274, 284
See application file for complete search history.

(56) References Cited

U.S. PATENT DOCUMENTS

| | | | |
|---|---|---|---|
| 2004/0036704 A1* | 2/2004 | Han .................. | H04N 5/57 345/690 |
| 2008/0068359 A1* | 3/2008 | Yoshida ............. | G09G 3/3406 345/204 |
| 2011/0110589 A1 | 5/2011 | Yen et al. | |

(Continued)

*Primary Examiner* — Ke Xiao
*Assistant Examiner* — Andrew Shin
(74) *Attorney, Agent, or Firm* — Cantor Colburn LLP

(57) ABSTRACT

An image processor includes an average luminance calculator which calculates an average luminance of a current frame based on a first average luminance of input image data corresponding to a partial screen and a second average luminance of previous image data corresponding to an entire screen, a conversion curve generator which generates a luminance conversion curve based on the average luminance, a luminance converter which generates conversion image data by converting luminance data of the input image data based on the luminance conversion curve, and an image merger which generates output image data by merging the conversion image data and the previous image data.

16 Claims, 10 Drawing Sheets

(56) References Cited

U.S. PATENT DOCUMENTS

2011/0249034 A1\* 10/2011 Nagai .................. G09G 3/3426
                                                          345/690
2012/0155764 A1\*  6/2012 Ogura .................... G06T 7/254
                                                          382/171

\* cited by examiner

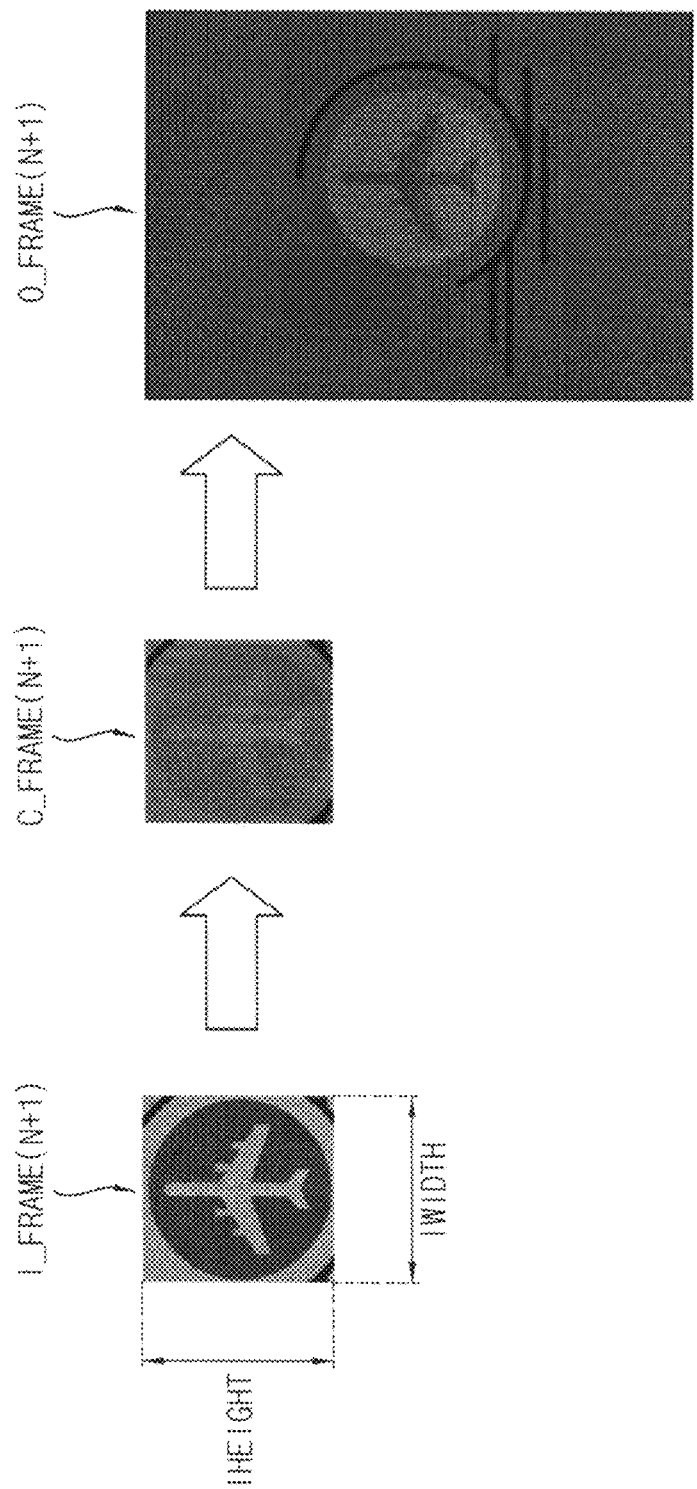

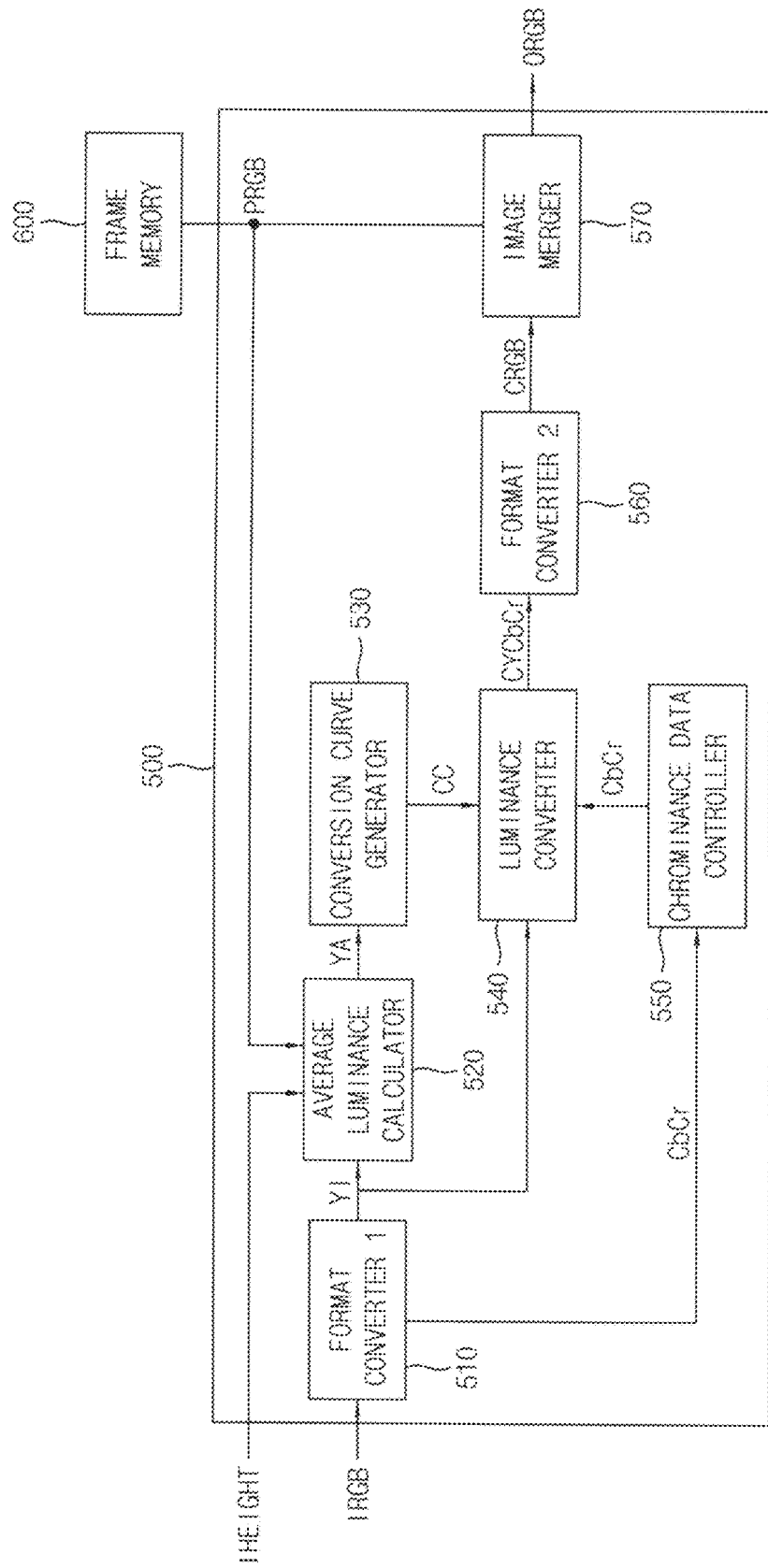

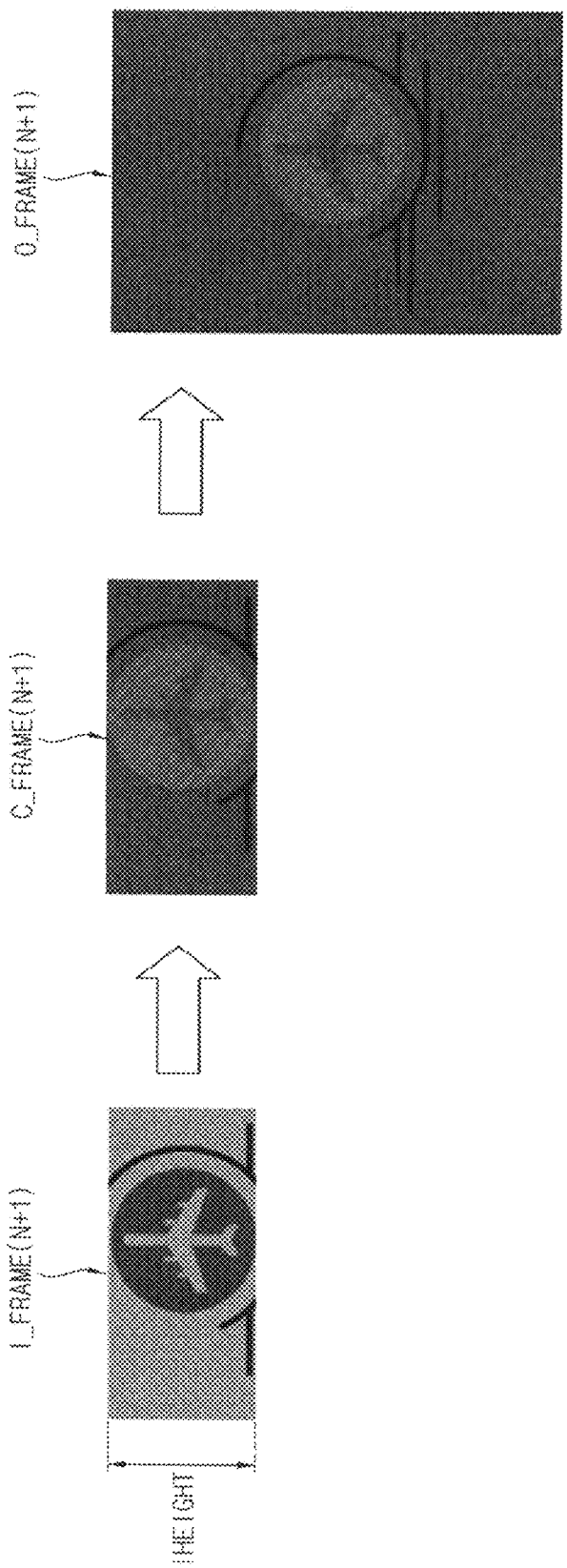

METHOD OF IMAGE PROCESSING, IMAGE PROCESSOR PERFORMING THE METHOD, AND DISPLAY DEVICE INCLUDING THE IMAGE PROCESSOR

This application claims to Korean Patent Application No. 10-2015-0107979 filed on Jul. 30, 2015, and all the benefits accruing therefrom under 35 U.S.C. § 119, the content of which in its entirety is herein incorporated by reference.

BACKGROUND

1. Field

Exemplary embodiments of the invention relate to display devices. More particularly, exemplary embodiments of the invention relate to a method of image processing, an image processor performing the method of image processing, and a display device having the image processor.

2. Description of the Related Art

Flat panel display ("FPD") devices are widely used as a display device of electronic devices because the FPD devices are relatively lightweight and thin compared to cathode-ray tube ("CRT") display device. Examples of FPD devices are liquid crystal display ("LCD") devices, plasma display panel ("PDP") devices, and organic light emitting display ("OLED") devices.

The display device adjusts a contrast ratio of image data to improve the display quality. Thus, the display device increases the contrast ratio of the image data so as to clearly display an image, or decreases the contrast ratio of the image data so as to smoothly display the image. The display device can increase or decrease the contrast ratio by adjusting luminance data of the image data, for example.

Methods of reducing the power consumption of the display device are developed. The display device stores the image data of previous frame in the frame memory and displays the image using the image data stored in the frame memory when input image data correspond to still image data or partial screen image data, for example.

SUMMARY

When a partial screen is updated, a display device calculates an average luminance of image data corresponding to an entire screen and controls a contrast ratio of the image data corresponding to the entire screen based on the average luminance, thereby decreasing an efficiency of the image processing.

Exemplary embodiments provide an image processor capable of reducing power consumption.

Exemplary embodiments provide a display device having the image processor.

Exemplary embodiments provide a method of image processing for the image processor.

According to some exemplary embodiments, an image processor may include an average luminance calculator which calculates an average luminance of a current frame based on a first average luminance of input image data corresponding to a partial screen and a second average luminance of previous image data corresponding to an entire screen, the previous image data stored in a frame memory, a conversion curve generator which generates a luminance conversion curve based on the average luminance, a luminance converter which generates conversion image data by converting luminance data of the input image data based on the luminance conversion curve, and an image merger which generates output image data by merging the conversion image data and the previous image data.

In exemplary embodiments, the average luminance calculator may receive position data of the input image data, calculate a resolution ratio of the partial screen to the entire screen based on the position data, and set a weighted average of the first average luminance and the second average luminance according to the resolution ratio as the average luminance.

In exemplary embodiments, the position data may include at least one of width data of the input image data, height data of the input image data, and a start point of the input image data.

In exemplary embodiments, the average luminance calculator may determine whether the input image data corresponds to the partial screen based on the position data.

In exemplary embodiments, the conversion curve generator may calculate a quadratic function graph with respect to the average luminance so as to generate the luminance conversion curve.

In exemplary embodiments, the conversion curve generator may calculate a linear function graph with respect to the average luminance and adjust the luminance conversion curve in a range between the linear function graph and the quadratic function graph.

In exemplary embodiments, the image merger may store the output image data in the frame memory.

In exemplary embodiments, the image processor may further include a first format converter which converts a format of the input image data from a RGB format to a conversion image format that is separated into luminance data and chrominance data, and a second format converter which converts a format of the conversion image data from the conversion image format to the RGB format.

In exemplary embodiments, the image processor may further include a chrominance data controller which controls an output timing of the chrominance data so as to generate the conversion image data.

In exemplary embodiments, the conversion image format may be a YCoCg format or a YCbCr format.

According to some exemplary embodiments, a display device may include a display panel including a plurality of pixels, a scan driver which provides a scan signal to the plurality of pixels, a data driver which provides a data signal to the plurality of pixels, a frame memory storing image data, an image processor generates conversion image data by adjusting luminance data of input image data corresponding to a partial screen and to generate output image data by merging the conversion image data and previous image data corresponding to an entire screen, the previous image data stored in the frame memory, and a timing controller which controls the scan driver and the data driver so as to display an image corresponding to the output image data.

In exemplary embodiments, the image processor may include an average luminance calculator which calculates an average luminance of a current frame based on a first average luminance of the input image data and a second average luminance of the previous image data, a conversion curve generator which generates a luminance conversion curve based on the average luminance, a luminance converter which generates the conversion image data by converting the luminance data of the input image data based on the luminance conversion curve, and an image merger which generates the output image data by merging the conversion image data and the previous image data.

In exemplary embodiments, the average luminance calculator may receive position data of the input image data, calculate a resolution ratio of the partial screen to the entire screen based on the position data, and set a weighted average of the first average luminance and the second average luminance according to the resolution ratio as the average luminance.

In exemplary embodiments, the position data may include at least one of width data of the input image data, height data of the input image data, and a start point of the input image data.

In exemplary embodiments, the average luminance calculator may determine whether the input image data corresponds to the partial screen based on the position data.

In exemplary embodiments, the image processor may further include a first format converter which converts a format of the input image data from a RGB format to a conversion image format that is separated into luminance data and chrominance data, and a second format converter which converts a format of the conversion image data from the conversion image format to the RGB format.

According to some exemplary embodiments, a method of image processing may include an operation of calculating an average luminance of a current frame based on a first average luminance of input image data corresponding to a partial screen and a second average luminance of previous image data corresponding to an entire screen, the previous image data stored in a frame memory, an operation of generating a luminance conversion curve based on the average luminance, an operation of converting luminance data of the input image data based on the luminance conversion curve so as to generate conversion image data, and an operation of generating output image data by merging the conversion image data and the previous image data.

In exemplary embodiments, the operation of calculating the average luminance may include an operation of receiving position data of the input image data, an operation of calculating a resolution ratio of the partial screen to the entire screen based on the position data, and an operation of setting a weighted average of the first average luminance and the second average luminance according to the resolution ratio as the average luminance.

In exemplary embodiments, the position data may include at least one of width data of the input image data, height data of the input image data, and a start point of the input image data.

In exemplary embodiments, the method may further include an operation of converting a format of the input image data from a RGB format to a conversion image format that is separated into luminance data and chrominance data, and an operation of converting a format of the conversion image data from the conversion image format to the RGB format.

Therefore, an image processor according to exemplary embodiments, when the partial screen of the entire screen is updated, generates conversion image data by adjusting contrast ratio of input image data corresponding to a partial screen and merges the conversion image data and previous image data corresponding to an entire screen. Specifically, the image processor receives the input image data corresponding to the partial screen and calculates an average luminance for the entire screen using a resolution ratio of resolution of the input image data to a resolution of the entire screen. The image processor generates the conversion image data by adjusting luminance data of the input image data based on the calculated average luminance. The image processor merges the conversion image data and previous image data. Therefore, the image processor may decrease an amount of image data to be processed and efficiently adjust the contrast ratio of the input image data.

A display device according to exemplary embodiments may reduce the power consumption and improve the display quality by including the image processor.

In addition, a method of image processing according to exemplary embodiments generates the conversion image data by adjusting the contrast ratio of the input image data corresponding to the partial screen and merges the conversion image data and the previous image data. Accordingly, the method of image processing may reduce the power consumption.

BRIEF DESCRIPTION OF THE DRAWINGS

Exemplary embodiments will be described more fully hereinafter with reference to the accompanying drawings, in which various embodiments are shown.

FIG. 6 is a diagram illustrating an example of processing input image data of (N+1)th frame by an image processor of FIG. 2.

FIG. 7 is a block diagram illustrating another example of an image processor included in a display device of FIG. 1.

FIG. 8 is a diagram illustrating an example of processing input image data of (N+1)th frame by an image processor of FIG. 7.

DETAILED DESCRIPTION

Figure 1:
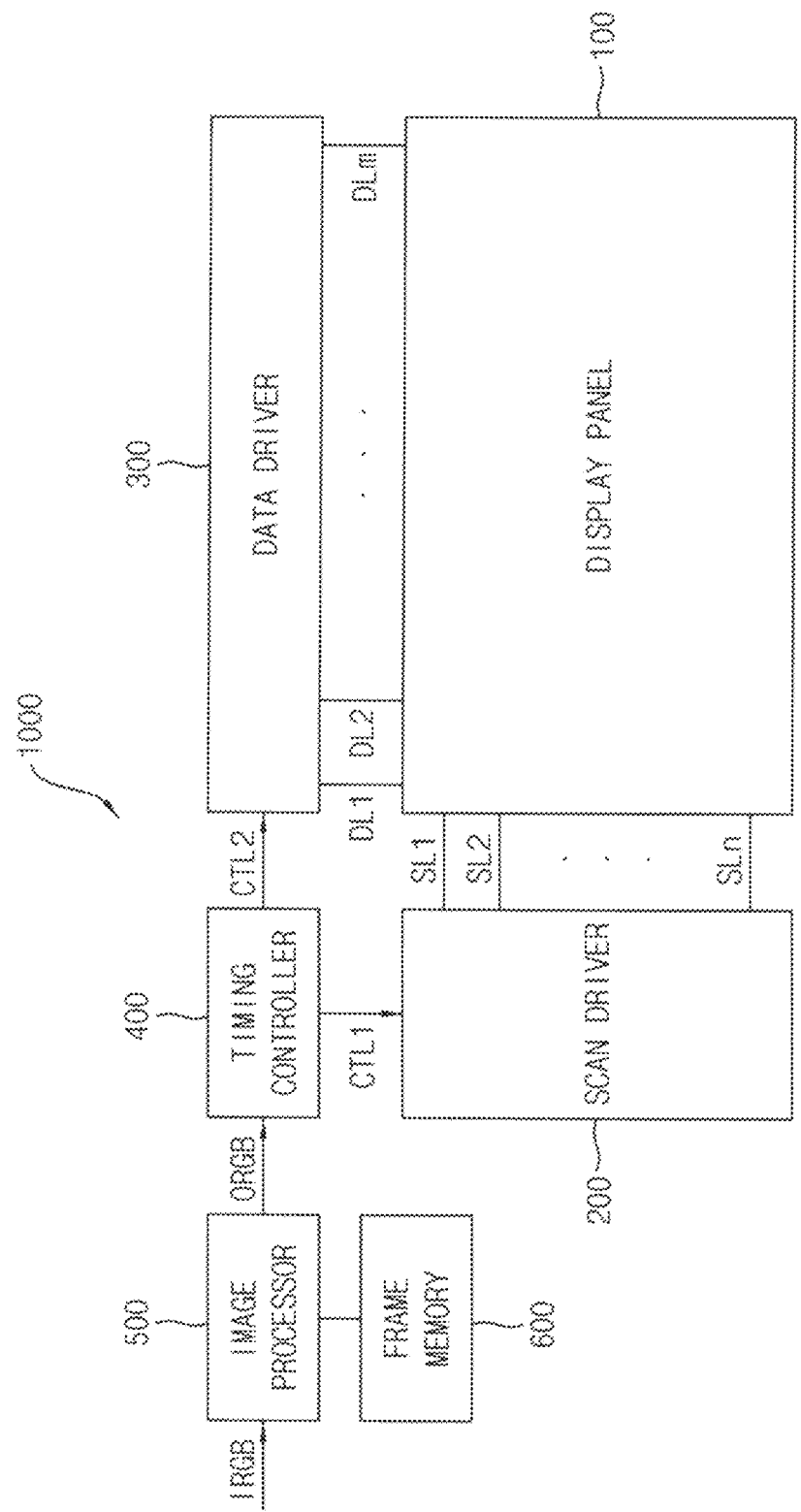
FIG. 1 is a block diagram illustrating exemplary embodiments of a display device according to the invention.

Exemplary embodiments will be described more fully hereinafter with reference to the accompanying drawings, in which various embodiments are shown.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display device according to exemplary embodiments.

Referring to FIG. 1, the display device 1000 may include a display panel 100, a scan driver 200, a data driver 300, a timing controller 400, an image processor 500, and a frame memory 600.

The display panel 100 may include a plurality of pixels PX. In an exemplary embodiment, the display panel 100 may include n by m(n*m) pixels PX because the pixels PX are arranged at locations corresponding to crossing points of the scan lines SL1 through SLn and the data lines DL1 through DLm, for example.

The scan driver 200 may provide a scan signal to the pixels PX via the scan lines SL1 through SLn based on a first control signal CTL1.

The data driver 300 may provide a data signal to the pixels PX via the data lines DL1 through DLm based on a second control signal CTL2.

The timing controller 400 may generate the first control signal CTL1 and the second control signal CTL2 and control the scan driver 200 and the data driver 300 so as to display an image corresponding to the output image data ORGB The image processor 500 may receive input image data IRGB and adjust a contrast ratio of the input image data IRGB to improve the display quality. In addition, the image processor 500 may store the image data in the frame memory 600 to reduce the power consumption. The image processor 500 may display the image using previous image data stored in the frame memory 600 when the input image data IRGB correspond to still image data or partial screen image data. Thus, when the partial screen of the entire screen is only updated, the image processor 500 may generate conversion image data by adjusting luminance data of the input image data IRGB corresponding to the partial screen. Thereafter, the image processor 500 may generate the output image data ORGB by merging the conversion image data and previous image data which are stored in the frame memory 600 and correspond to the entire screen.

In one exemplary embodiment, the image processor 500 may receive image data corresponding to the partial screen and calculate the average luminance of the entire screen using a ratio of a resolution of the partial screen corresponding to the input image data IRGB to a resolution of the entire screen. The image processor 500 may generate the conversion image data by adjusting luminance data of the input image data IRGB based on the calculated average luminance. The image processor 500 may merge the conversion image data and the previous image data. Therefore, the image processor 500 may adjust the contrast ratio of an updated portion when the partial screen of the entire screen is updated, thereby decreasing an amount of image data to be processed and reducing the power consumption. Hereinafter, the structure of the image processor 500 will be described in more detail with reference to the FIGS. 2 and 7.

The frame memory 600 may store the image data. In one exemplary embodiment, the frame memory 600 may store the output image data of previous frame (i.e., previous image data). Therefore, when the image data of a current frame (i.e., current image data) are the same as the previous image data or the current image data are partially updated in comparison with the previous image data, the amount of image data to be processed may be decreased by generating the output image data ORGB using the previous image data stored in the frame memory 600.

In one exemplary embodiment, the frame memory 600 may be a volatile memory device. When the frame memory 600 is the volatile memory device, the frame memory 600 may relatively quickly read or write data. In an exemplary embodiment, the frame memory 600 may include a dynamic random access memory ("DRAM"), a static random access memory ("SRAM"), a mobile DRAM, etc., for example. In another exemplary embodiment, the frame memory may be a non-volatile memory device. When the frame memory 600 is the non-volatile memory device, the frame memory 600 may have a variety of advantages such as capability to maintain stored data while power is not supplied, capability to store mass data, low cost, etc., for example. In an exemplary embodiment, the frame memory 600 may include flash memory, erasable programmable read-only memory ("EPROM"), electrically erasable programmable read-only memory ("EEPROM"), phase change random access memory ("PRAM"), resistance random access memory ("RRAM"), nano floating gate memory ("NFGM"), polymer random access memory ("PoRAM"), magnetic random access memory ("MRAM"), ferroelectric random access memory ("FRAM"), etc., for example.

Figure 2:
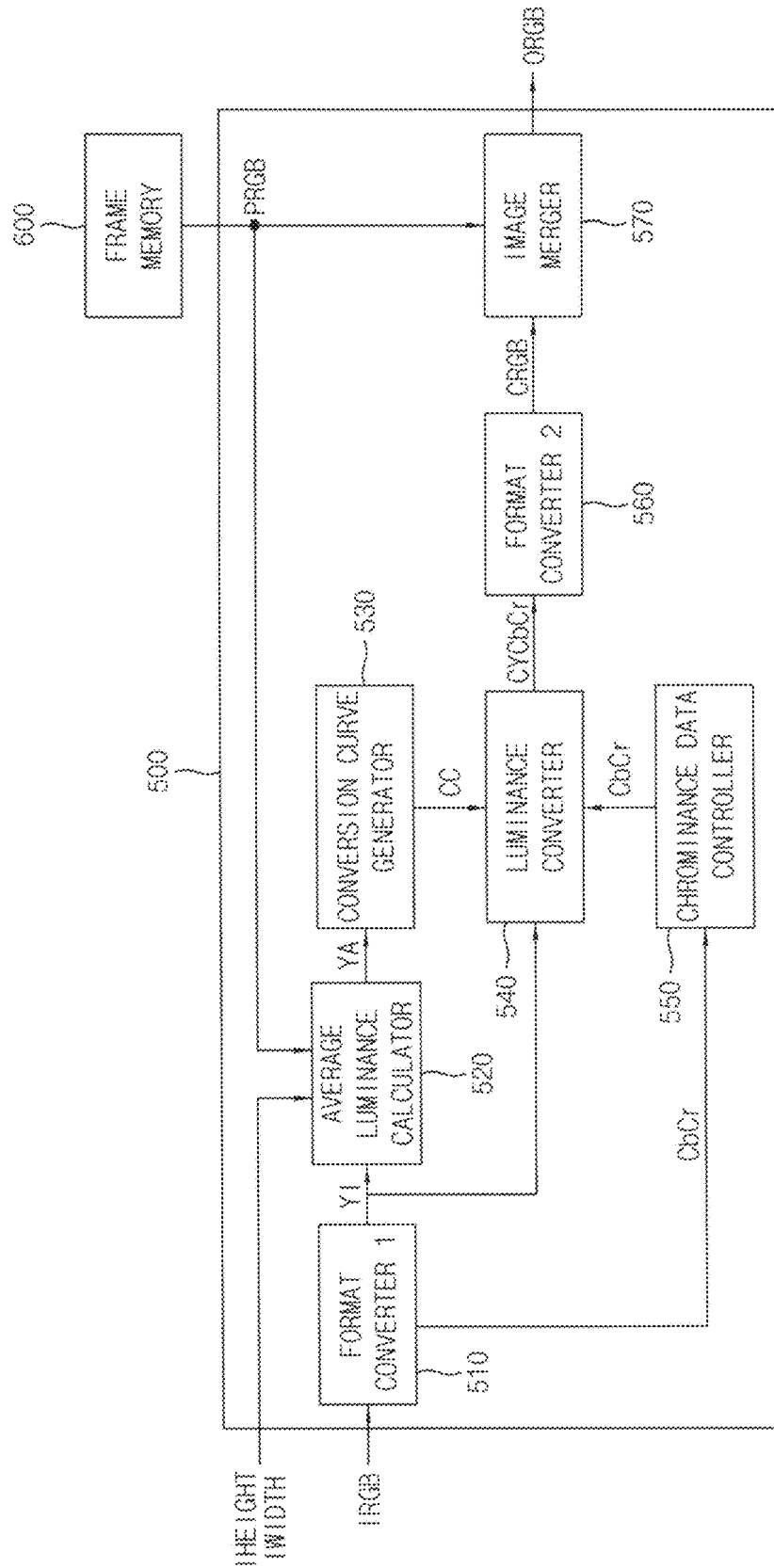
FIG. 2 is a block diagram illustrating one example of an image processor included in a display device of FIG. 1.

FIG. 2 is a block diagram illustrating one exemplary embodiment of an image processor included in a display device of FIG. 1.

Referring to FIG. 2, the image processor 500 may include a first format converter 510, an average luminance calculator 520, a conversion curve generator 530, a luminance converter 540, a chrominance data controller 550, a second format converter 560, and an image merger 570.

The first format converter 510 may convert a format of the input image data IRGB from a RGB format to a conversion image format. Here, the conversion image format is separated into luminance data and chrominance data. Thus, the first format converter 510 may change the format of the input image data IRGB to adjust luminance data YI of the input image data. In one exemplary embodiment, the first format converter 510 may convert the format of the input image data IRGB from the RGB format to the YCoCg format or the YCbCr format. The YCoCg format includes luminance data Y, chrominance data of orange color Co, and chrominance data of green color Cg. The YCbCr format includes luminance data Y, chrominance data of blue color Cb, and chrominance data of red color Cr. The YCoCg format has advantages of simple and fast calculation in comparison with the YCbCr format.

The average luminance calculator 520 may calculate an average luminance YA of a current frame based on a first average luminance of input image data IRGB corresponding to the partial screen and a second average luminance of previous image data PRGB that correspond to the entire screen and are stored in the frame memory 600. In one exemplary embodiment, the average luminance calculator 520 may receive position data (e.g., width data, height data, etc.) of the input image data, calculate a resolution ratio of the partial screen to the entire screen based on the position data, and set a weighted average of the first average luminance and the second average luminance according to the resolution ratio as the average luminance YA. In an exemplary embodiment, average luminance calculator 520 may calculate the average luminance YA according to [Equation 1] below, for example:

$$YA = YA1 \times \left(\frac{RSp}{RSf}\right) + YA2 \times \left(1 - \frac{RSp}{RSf}\right),$$ [Equation 1]

where, YA is the average luminance of the current frame, YA1 is the first average luminance of the input image data corresponding to the partial screen, YA2 is the second average luminance of the previous image data corresponding to the entire screen, RSf is a resolution of the entire screen, RSp is a resolution of the partial screen.

In one exemplary embodiment, the average luminance calculator 520 may calculate the second average luminance using a start point of the input image data with previous image data PRGB that exclude data corresponding to a portion of the input image data. Therefore, the average luminance calculator 520 may accurately calculate the average luminance YA of the current frame using the input image data IRGB and the previous image data PRGB.

In one exemplary embodiment, the average luminance calculator 520 may determine whether the input image data IRGB correspond to the partial screen based on the position data. When the width data IWIDTH and the height data IHEIGHT of the input image data included in the position data are substantially the same as width and height of the entire screen, the average luminance calculator 520 may determine that the entire screen is updated and the input image data IRGB correspond to the entire screen. When the width data IWIDTH and the height data IHEIGHT of the input image data included in the position data are different from width and height of the entire screen, the average luminance calculator 520 may determine that the partial screen among the entire screen is updated and the input image data IRGB correspond to the partial screen.

The conversion curve generator 530 may generate a luminance conversion curve CC based on the average luminance YA. Here, the luminance conversion curve CC includes data for converting input luminance data into output luminance data. In an exemplary embodiment, the luminance conversion curve CC may indicate a graph that shows a relationship between input luminance data and output luminance data, for example. In one exemplary embodiment, the conversion curve generator 530 may calculate a quadratic function graph with respect to the average luminance so as to generate the luminance conversion curve CC. In addition, the conversion curve generator 530 may calculate a linear function graph with respect to the average luminance and to adjust the luminance conversion curve CC in a range between the linear function graph and the quadratic function graph. Hereinafter, a method of generating and adjusting the luminance conversion curve will be described in more detail with reference to the FIGS. 3A and 3B.

The luminance converter 540 may generate conversion image data CYCbCr by converting luminance data YI of the input image data based on the luminance conversion curve CC. The luminance converter 540 may convert the luminance data YI into corresponding output luminance data based on the luminance conversion curve CC. Also, the luminance converter 540 may receive the chrominance data CbCr from the chrominance data controller 550 and generate the conversion image data CYCbCr by combining the output luminance data and the chrominance data.

The chrominance data controller 550 may control an output timing of the chrominance data CbCr so as to generate the conversion image data CYCbCr. The chrominance data controller 550 may synchronize the chrominance data CbCr with the output luminance data from the luminance converter 540 by controlling the output timing of the chrominance data CbCr.

The second format converter 560 may convert a format of the conversion image data CYCbCr from the conversion image format to the RGB format. In one exemplary embodiment, the second format converter 560 may convert the format of the conversion image data CYCbCr from the YCoCg format or the YCbCr format to the RGB format.

The image merger 570 may generate the output image data ORGB by merging the conversion image data CRGB and the previous image data PRGB. When the input image data IRGB correspond to the partial screen of the entire screen, the image merger 570 may generate the output image data ORGB by merging the conversion image data CRGB and the previous image data PRGB. In one exemplary embodiment, the image merger 570 may store the output image data ORGB in the frame memory 600. Therefore, when the input image data correspond to the still image data or the partial screen image data, the image processor 500 may generate the output image data ORGB using the previous image data PRGB stored in the frame memory 600, thereby reducing the power consumption.

Figure 3A:
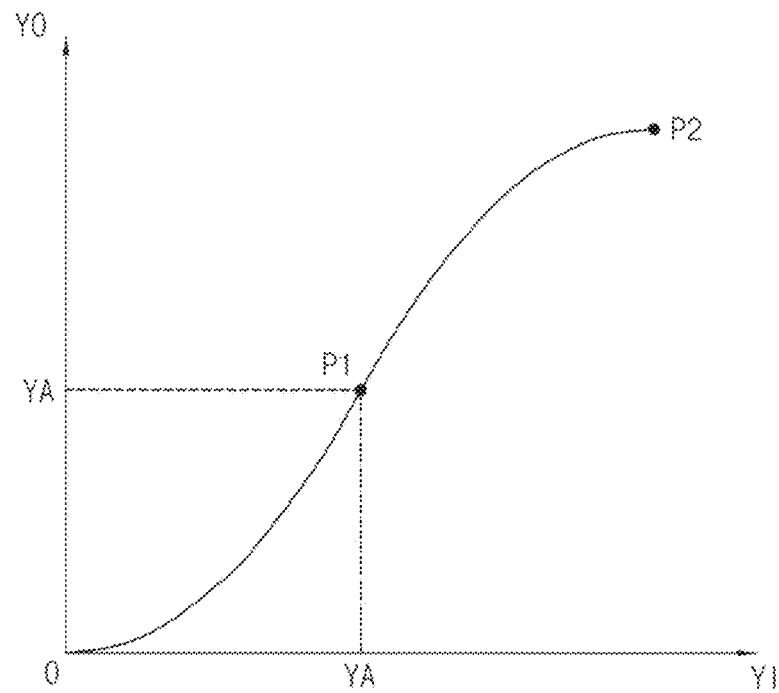
FIGS. 3A and 3B are graphs for describing a conversion curve generated by an image processor of FIG. 2.
Figure 3B:
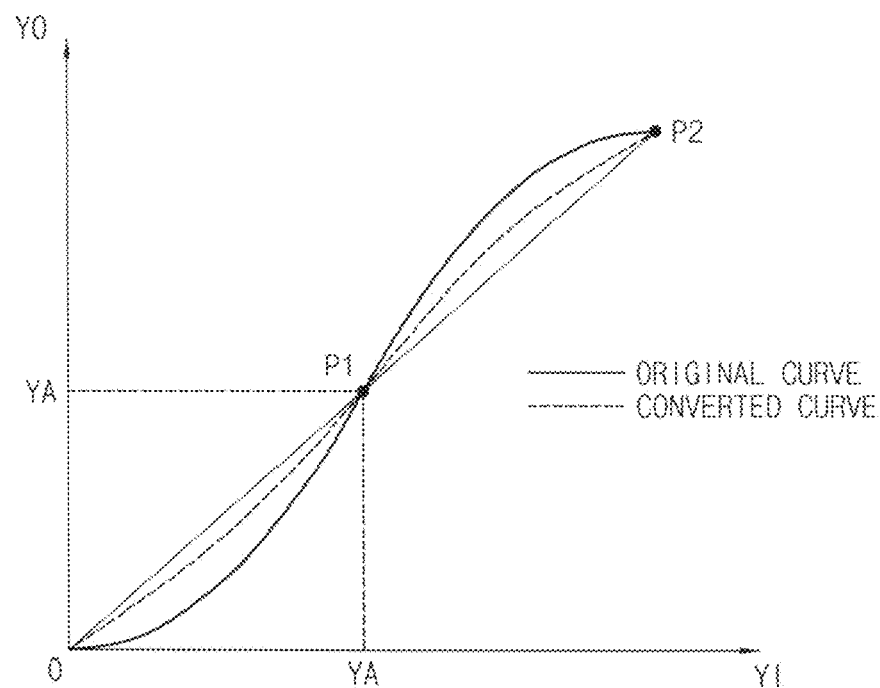

FIGS. 3A and 3B are graphs for describing a conversion curve generated by an image processor of FIG. 2.

Referring to FIGS. 3A and 3B, the conversion curve generator of the image processor may generate the luminance conversion curve to adjust the contrast ratio of the input image data.

As shown in FIG. 3A, the conversion curve generator may generate a luminance conversion curve by calculating a quadratic function graph with respect to the average luminance. The luminance conversion curve represents a graph having the input luminance data YI on an x-axis and the output luminance data YO on a y-axis. The conversion curve generator may calculate the quadratic function graph passing through an origin point O(0, 0) and a first point P1(average luminance YA, average luminance YA) to generate the luminance conversion curve of which the x-axis value is in a range between 0 and the average luminance YA. In an exemplary embodiment, the conversion curve generator may calculate the luminance conversion curve of which the x-axis value is in a range between 0 and the average luminance YA according to [Equation 2] below, for example:

$$YO = \frac{1}{YA} YI^2,$$ [Equation 2]

where, YO is the output luminance data, YA is the average luminance data, YI is the input luminance data (YI is between 0 and YA).

In addition, the conversion curve generator may calculate a quadratic function graph passing through the first point P1(average luminance YA, average luminance YA) and a second point P2(maximum luminance, maximum luminance) to generate the luminance conversion curve of which the x-axis value is in a range between the average luminance and the maximum luminance. In an exemplary embodiment, when the maximum luminance is 255, the conversion curve generator may calculate the luminance conversion curve of which the x-axis value is in a range between the average luminance YA and the maximum luminance according to [Equation 3] below, for example:

$$YO = -\frac{1}{(255 - YA)}(YI - 255)^2 + 255,$$ [Equation 3]

where, YO is the output luminance data, YA is the average luminance data, YI is the input luminance data (YI is between YA and 255).

As shown in FIG. 3B, the conversion curve generator may calculate a linear function graph with respect to the average luminance and adjust the luminance conversion curve in a range between the linear function graph and the quadratic function graph. In an exemplary embodiment, the conversion curve generator may calculate the linear function graph passing through the origin point O(0, 0) and the first point P1(average luminance YA, average luminance YA), for example. The conversion curve generator may adjust the luminance conversion curve such that output luminance data YO are determined in the range between the linear function graph and the quadratic function graph. In an exemplary embodiment, the conversion curve generator may adjust the luminance conversion curve according to [Equation 4] below, for example:

$$y = y1 - \frac{1}{k}(y1 - y2),$$ [Equation 4]

where, y is an adjusted luminance conversion curve, y1 is the linear function graph, y2 is quadratic function graph, k is a constant value. In this case, the contrast ratio of the output image data is adjusted according to the constant value k.

Figure 4:
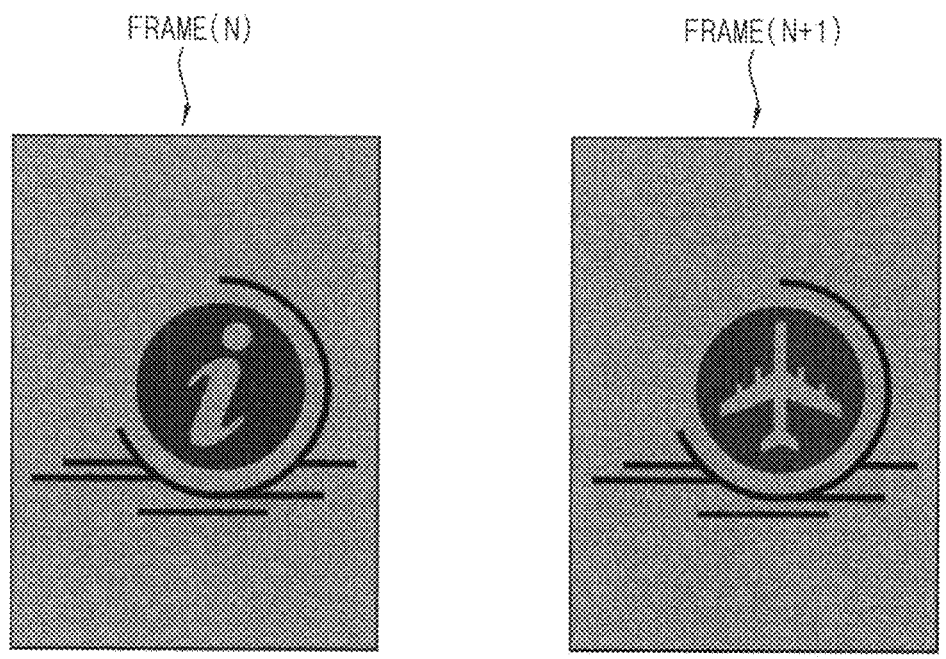
FIG. 4 is a diagram illustrating an example of image data of (N)th and (N+1)th frames that are displayed by a display device of FIG. 1.
Figure 5:
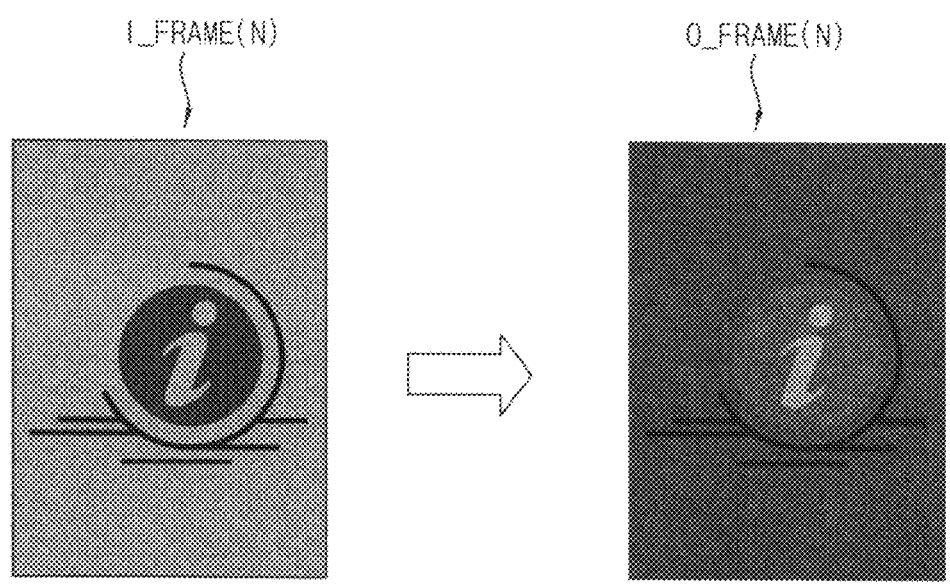
FIG. 5 is a diagram illustrating an example of processing input image data of (N)th frame by an image processor of FIG. 2.

FIG. 4 is a diagram illustrating an example of image data of (N)th and (N+1)th frames that are displayed by a display device of FIG. 1. FIG. 5 is a diagram illustrating an example of processing input image data of (N)th frame by an image processor of FIG. 2. FIG. 6 is a diagram illustrating an example of processing input image data of (N+1)th frame by an image processor of FIG. 2.

Referring to FIGS. 4 through 6, when the partial screen of the entire screen is updated, the image processor may adjust the contrast ratio of the input image data corresponding to the partial screen. Thereafter, the image processor may merge the adjusted input image data and previous image data corresponding to the entire screen. Therefore, the image processor may decrease an amount of image data to be processed and reduce the power consumption.

As shown in FIG. 4, image data of a (N)th frame FRAME (N) are updated on the entire screen in comparison with image data of a (N−1)th frame. Image data of a (N+1) frame FRAME(N+1) are updated on the partial screen in comparison with the image data of the (N)th frame FRAME(N).

As shown in FIG. 5, a host device provides input image data of the (N)th frame I_FRAME(N) corresponding to the entire screen to the image processor of the display device. The image processor may generate output image data of the (N)th frame O_FRAME(N) by adjusting luminance data (i.e., contrast ratio) of the input image data of the (N)th frame I_FRAME(N) so as to improve the display quality. The display device may display an image corresponding to the output image data of the (N)th frame O_FRAME(N). The output image data of the (N)th frame O_FRAME(N) may be stored in the frame memory.

As shown in FIG. 6, in order to efficiently process the image data, the host device may provide input image data of a (N+1)th frame I_FRAME(N+1) corresponding to the partial screen of the entire screen to the image processor of the display device. The image processor may determine that the input image data correspond to the partial screen of the entire screen using the position data (e.g., width data IWIDTH, height data IHEIGHT, etc.) of the input image data. The image processor may calculate a resolution ratio of the partial screen to the entire screen based on the width data IWIDTH and the height data IHEIGHT. The image processor may calculate the average luminance by calculating a weighted average of a first average luminance of input image data of the (N+1)th frame I_FRAME(N+1) and a second average luminance of previous image data (i.e., image data of the (N)th frame) according to the resolution ratio. The image processor may adjust the luminance data (i.e., contrast ratio) of the input image data of the (N+1)th frame I_FRAME(N+1) based on the average luminance, thereby generating conversion image data of the (N+1)th frame C_FRAME(N+1) corresponding to the partial screen. In addition, the image processor may merge the conversion image data of the (N+1)th frame C_FRAME(N+1) and previous image data (i.e., image data of the (N)th frame) in the frame memory, thereby generating the output image data of the (N+1)th frame O_FRAME(N+1). The display device may display an image corresponding to the output image data of the (N+1)th frame O_FRAME(N+1).

FIG. 7 is a block diagram illustrating another exemplary embodiment of an image processor included in a display device of FIG. 1.

Referring to FIG. 7, the image processor 500 may include a first format converter 510, an average luminance calculator 520, a conversion curve generator 530, a luminance converter 540, a chrominance data controller 550, a second format converter 560, and an image merger 570. The image processor 500 according to the exemplary embodiment is substantially the same as the image processor of the exemplary embodiment described in FIG. 2, except that the average luminance calculator 520 receives height data IHEIGHT without width data IWIDTH as position data. Therefore, the same reference numerals will be used to refer to the same or like parts as those described in the previous exemplary embodiment of FIG. 2, and any repetitive explanation concerning the above elements will be omitted.

The first format converter 510 may convert a format of the input image data IRGB from a RGB format to a conversion image format. Here, the conversion image format is separated into luminance data and chrominance data.

The average luminance calculator 520 may calculate an average luminance YA of a current frame based on a first average luminance of input image data IRGB corresponding to the partial screen and a second average luminance of previous image data PRGB that correspond to the entire screen and are stored in the frame memory 600. In one exemplary embodiment, the average luminance calculator 520 may receive the width data of the input image data as the position data, calculate a resolution ratio of the partial screen to the entire screen based on the position data, and set a weighted average of the first average luminance and the second average luminance according to the resolution ratio as the average luminance YA.

In one exemplary embodiment, the average luminance calculator 520 may calculate the second average luminance using a start point of the input image data with previous image data PRGB that exclude data corresponding to a portion of the input image data.

In one exemplary embodiment, the average luminance calculator 520 may determine whether the input image data IRGB correspond to the partial screen based on the height data IHEIGHT. When the height data IHEIGHT of the input image data are substantially the same as a height of the entire screen, the average luminance calculator 520 may determine that the entire screen is updated and the input image data IRGB correspond to the entire screen. When the height data IHEIGHT of the input image data are different from the height of the entire screen, the average luminance calculator 520 may determine that the partial screen of the entire screen is updated and the input image data IRGB correspond to the partial screen.

The conversion curve generator 530 may generate a luminance conversion curve CC based on the average luminance YA.

The luminance converter 540 may generate conversion image data CYCbCr by converting luminance data YI of the input image data based on the luminance conversion curve CC.

The chrominance data controller 550 may control an output timing of the chrominance data CbCr so as to generate the conversion image data CYCbCr.

The second format converter 560 may convert a format of the conversion image data CYCbCr from the conversion image format to the RGB format.

The image merger 570 may generate the output image data ORGB by merging the conversion image data CRGB and the previous image data PRGB. When the input image data IRGB correspond to the partial screen of the entire screen, the image merger 570 may generate the output image data ORGB by merging the conversion image data CRGB and the previous image data PRGB.

FIG. 8 is a diagram illustrating an example of processing input image data of (N+1)th frame by an image processor of FIG. 7.

Referring to FIGS. 4, 5, and 8, when the partial screen of the entire screen is updated, the image processor may adjust the contrast ratio of the input image data corresponding to the partial screen. Thereafter, the image processor may merge the adjusted input image data and previous image data corresponding to the entire screen. Therefore, the image processor may decrease an amount of image data to be processed and reduce the power consumption.

As shown in FIG. 4, image data of a (N)th frame FRAME(N) are updated on the entire screen in comparison with image data of a (N−1)th frame. Image data of a (N+1) frame FRAME(N+1) are updated on the partial screen in comparison with the image data of the (N)th frame FRAME(N).

As shown in FIG. 5, a host device provides input image data of the (N)th frame I_FRAME(N) corresponding to the entire screen to the image processor of the display device. The image processor may generate output image data of the (N)th frame O_FRAME(N) by adjusting luminance data (i.e., contrast ratio) of the input image data of the (N)th frame I_FRAME(N) so as to improve the display quality. The display device may display an image corresponding to the output image data of the (N)th frame O_FRAME(N). The output image data of the (N)th frame O_FRAME(N) may be stored in the frame memory.

As shown in FIG. 8, in order to efficiently process the image data, the host device may provide input image data of a (N+1)th frame I_FRAME(N+1) corresponding to the partial screen of the entire screen to the image processor of the display device. Here, the input image data of the (N+1) frame I_FRAME(N+1) may be a portion including updated line of the entire screen. The image processor may determine that the input image data correspond to the partial of among the entire screen using the height data IHEIGHT of the input image data. The image processor may calculate a resolution ratio of the partial screen to the entire screen based on the height data IHEIGHT. The image processor may calculate the average luminance by calculating a weighted average of a first average luminance of input image data of the (N+1)th frame I_FRAME(N+1) and a second average luminance of previous image data (i.e., image data of the (N)th frame) according to the resolution ratio. The image processor may adjust the luminance data (i.e., contrast ratio) of the input image data of the (N+1)th frame I_FRAME(N+1) based on the average luminance, thereby generating conversion image data of the (N+1)th frame C_FRAME(N+1) corresponding to the partial screen. In addition, the image processor may merge the conversion image data of the (N+1)th frame C_FRAME(N+1) and previous image data (i.e., image data of the (N)th frame) in the frame memory, thereby generating the output image data of the (N+1)th frame O_FRAME(N+1). The display device may display an image corresponding to the output image data of the (N+1)th frame O_FRAME(N+1).

Therefore, when the resolution ratio of the partial screen to the entire screen is calculated based on the height data of the input image data, the input image data may be derived by checking updating of the image by a line unit. Accordingly, a load of the image processor may be reduced.

Although the exemplary embodiments of FIGS. 7 and 8 describe that the image processor calculates the resolution ratio of the partial screen to the entire screen based on the height data of the input image data, the method of calculating the resolution ratio is not limited thereto. In an exemplary embodiment, the image processor may calculate the resolution ratio of the partial screen to the entire screen based on the width data of the input image data, for example.

Figure 9A:
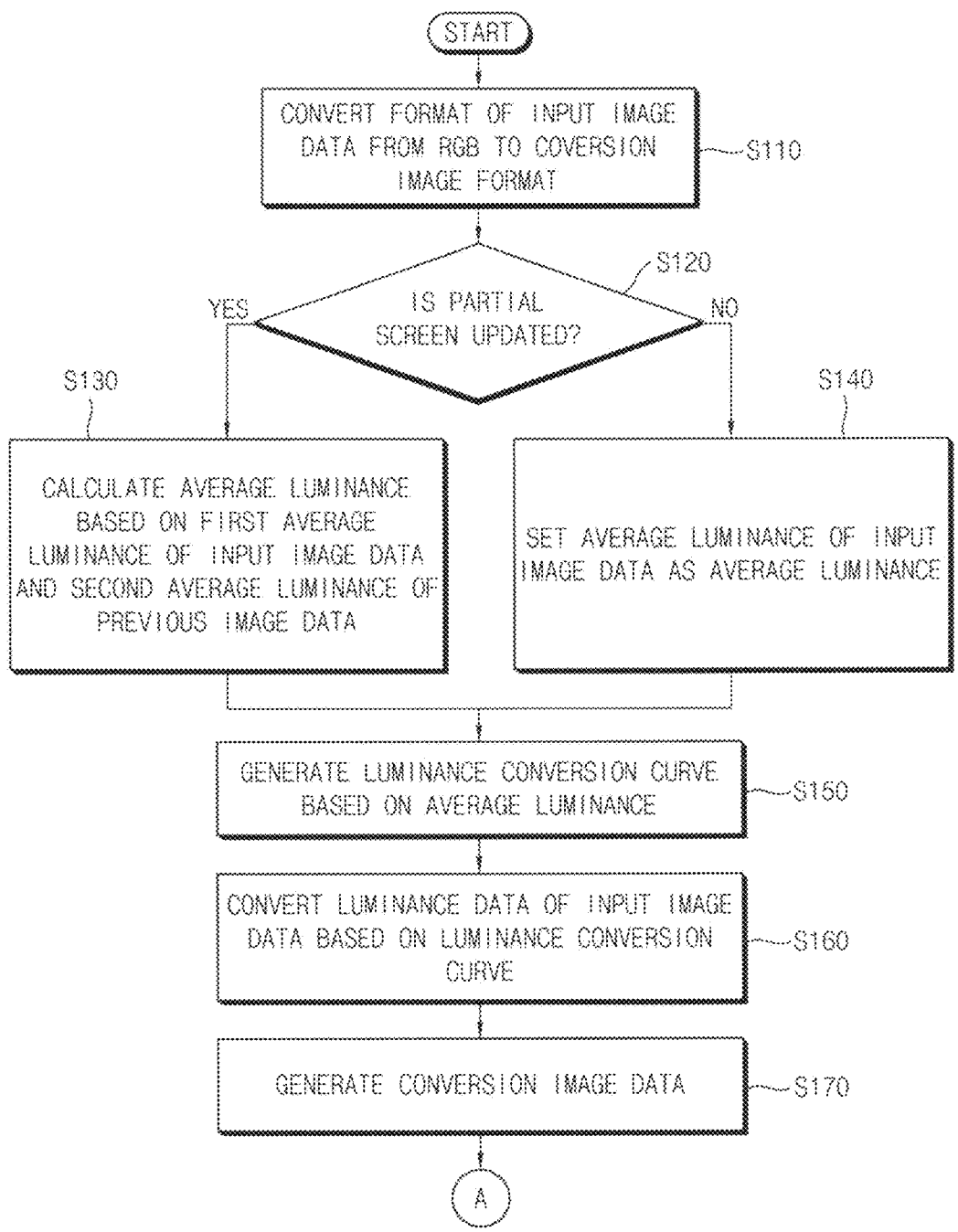
FIGS. 9A and 9B are flow charts illustrating exemplary embodiments of a method of image processing according to the invention.
Figure 9B:
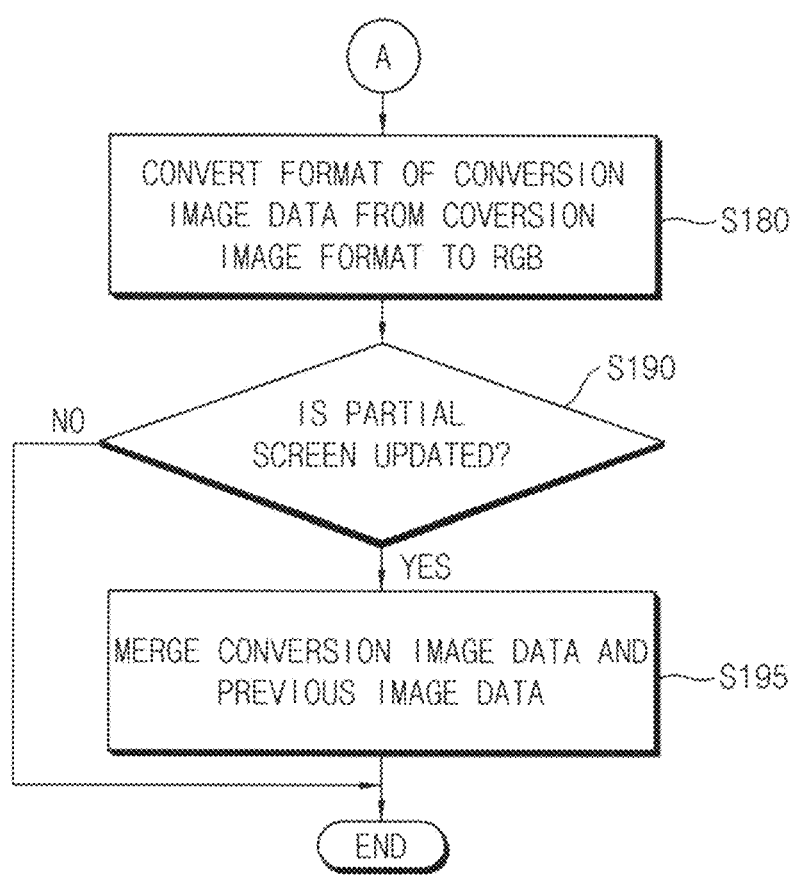

FIGS. 9A and 9B are flow charts illustrating a method of image processing according to exemplary embodiments.

Referring to FIGS. 9A and 9B, a format of the input image data may be converted from a RGB format to a conversion image format (S110). Here, the conversion image format is that is separated into luminance data and chrominance data. In an exemplary embodiment, the conversion image format may be the YCoCg format or the YCbCr format, for example. The YCoCg format includes luminance data Y, chrominance data of orange color Co, and chrominance data of green color Cg. The YCbCr format includes luminance data Y, chrominance data of blue color Cb, and chrominance data of red color Cr. The YCoCg format has advantages of simple and fast calculation in comparison with the YCbCr format.

Whether the partial screen is updated may be determined based on the position data (S120). In an exemplary embodiment, when width data and height data of the input image data as the position data are substantially the same as width and height of the entire screen, it is determined that the entire screen is updated, for example. When the width data and the height data of the input image data are different from width and height of the entire screen, it is determined that the partial screen is updated.

When the partial screen is updated, an average luminance of a current frame may be calculated based on a first average luminance of input image data corresponding to the partial screen and a second average luminance of previous image data that correspond to the entire screen and are stored in the frame memory (S130). When the entire screen is updated, the average luminance may be derived from the input image data because the input image data correspond to the entire screen (S140).

A luminance conversion curve may be generated based on the average luminance (S150). In one exemplary embodiment, the luminance conversion curve may be generated by calculating a quadratic function graph with respect to the average luminance, for example. In addition, a linear function graph may be calculated with respect to the average luminance and the luminance conversion curve may be adjusted in a range between the linear function graph and the quadratic function graph.

Luminance data of the input image data may be converted into output luminance data based on the luminance conversion curve (S160).

The conversion image data may be generated by controlling the output timing of the chrominance data such that the output luminance data are synchronized with the chrominance data (S170).

A format of the conversion image data may be converted from the conversion image format to the RGB format (S180).

Because methods of calculating the average luminance and methods of generating the conversion image data from the input image data based on the average luminance are described above, duplicated descriptions will be omitted.

Whether the partial screen is updated may be determined using position data of the input image data (S190). When the partial screen is updated, the output image data may be generated by merging the conversion image data and the previous image data (S195). When the entire screen is updated, the conversion image data may be outputted as the output image data because the conversion image data correspond to the entire screen.

Figure 10:
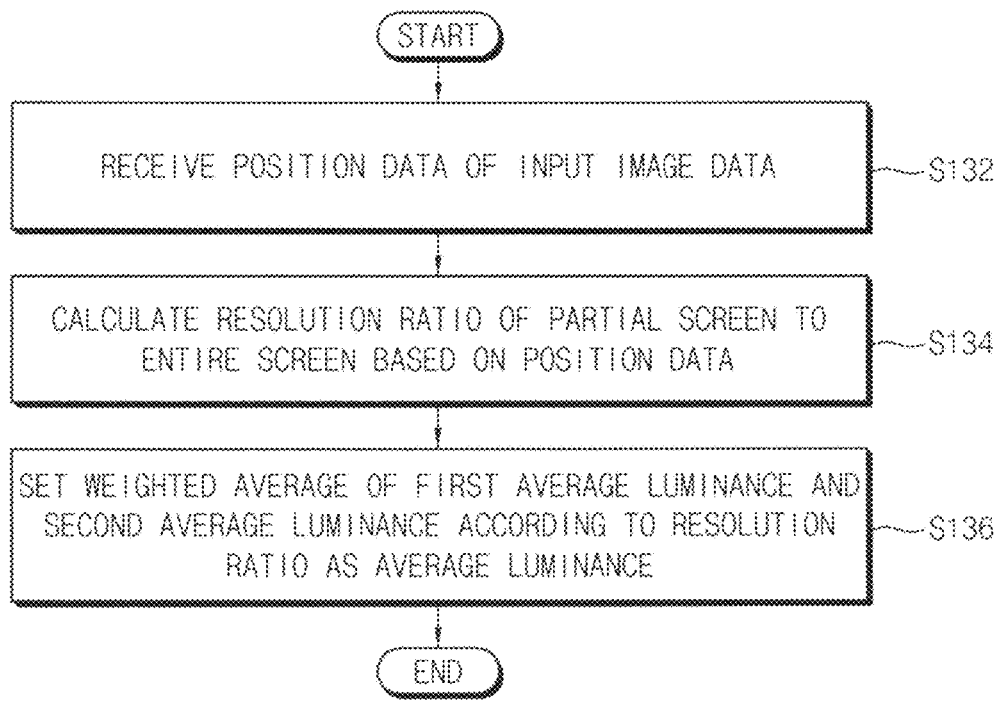
FIG. 10 is a flow chart illustrating an example of calculating an average luminance of a current frame.

FIG. 10 is a flow chart illustrating an example of calculating an average luminance of a current frame.

Referring to FIG. 10, in order to calculate the average luminance, the image processor may receive position data of the input image data (S132). In one exemplary embodiment, the position data may include at least one of width data of the input image data, height data of the input image data, and a start point of the input image data.

The image processor may calculate a resolution ratio of the partial screen to the entire screen based on the position data (S134). The image processor may set a weighted average of the first average luminance and the second average luminance according to the resolution ratio as the average luminance (S136). In an exemplary embodiment, the average luminance may calculated according to [Equation 1] below, for example:

$$YA = YA1 \times \left(\frac{RSp}{RSf}\right) + YA2 \times \left(1 - \frac{RSp}{RSf}\right), \quad \text{[Equation 1]}$$

where, YA is the average luminance of the current frame, YA1 is the first average luminance of the input image data corresponding to the partial screen, YA2 is the second average luminance of the previous image data corresponding to the entire screen, RSf is a resolution of the entire screen, RSp is a resolution of the partial screen.

Although the exemplary embodiments describe that a format of input image data and output image data is the RGB format, the format of the input image data and the output image is not limited thereto.

The invention may be applied to an electronic device having the display device. In an exemplary embodiment, the invention may be applied to a cellular phone, a smart phone, a smart pad, a personal digital assistant ("PDA"), etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An image processor comprising:
an average luminance calculator which calculates an average luminance of a current frame based on a first average luminance of input image data corresponding to a partial screen and a second average luminance of previous image data corresponding to an entire screen, the previous image data stored in a frame memory;
a conversion curve generator which generates a luminance conversion curve based on the average luminance;
a luminance converter which generates conversion image data by converting luminance data of the input image data based on the luminance conversion curve; and
an image merger which generates output image data by merging the conversion image data and the previous image data,
wherein the average luminance calculator receives position data of the input image data, calculates a resolution ratio of the partial screen to the entire screen, which is a ratio of a height of the partial screen to a height of the entire screen, a ratio of a width of the partial screen to a width of the entire screen, or a ratio of a size of the partial screen to a size of the entire screen, based on the position data, and sets a weighted average of the first average luminance and the second average luminance according to the resolution ratio as the average luminance.

2. The image processor of claim 1, wherein the position data include at least one of width data of the input image data, height data of the input image data, and a start point of the input image data.

3. The image processor of claim 1, wherein the average luminance calculator determines whether the input image data corresponds to the partial screen based on the position data.

4. The image processor of claim 1, wherein the conversion curve generator calculates a quadratic function graph with respect to the average luminance and generates the luminance conversion curve.

5. The image processor of claim 4, wherein the conversion curve generator calculates a linear function graph with respect to the average luminance and adjusts the luminance conversion curve in a range between the linear function graph and the quadratic function graph.

6. The image processor of claim 1, wherein the image merger stores the output image data in the frame memory.

7. The image processor of claim 1, further comprising:
a first format converter which converts a format of the input image data from a RGB format to a conversion image format which is separated into luminance data and chrominance data; and
a second format converter which converts a format of the conversion image data from the conversion image format to the RGB format.

8. The image processor of claim 7, further comprising:
a chrominance data controller which controls an output timing of the chrominance data and generates the conversion image data.

9. The image processor of claim 7, wherein the conversion image format is one of a YCoCg format and a YCbCr format.

10. A display device comprising:
a display panel including a plurality of pixels;
a scan driver which provides a scan signal to the plurality of pixels;
a data driver which provides a data signal to the plurality of pixels;
a frame memory storing image data;
an image processor which generates conversion image data by adjusting luminance data of input image data corresponding to a partial screen and to generate output image data by merging the conversion image data and previous image data corresponding to an entire screen, the previous image data stored in the frame memory; and
a timing controller which controls the scan driver and the data driver and displays an image corresponding to the output image data,
wherein the image processor includes:
an average luminance calculator which calculates an average luminance of a current frame based on a first average luminance of the input image data and a second average luminance of the previous image data;
a conversion curve generator which generates a luminance conversion curve based on the average luminance;
a luminance converter which generates the conversion image data by converting the luminance data of the input image data based on the luminance conversion curve; and
an image merger which generates the output image data by merging the conversion image data and the previous image data, and
wherein the average luminance calculator receives position data of the input image data, calculates a resolution ratio of the partial screen to the entire screen, which is a ratio of a height of the partial screen to a height of the entire screen, a ratio of a width of the partial screen to a width of the entire screen, or a ratio of a size of the partial screen to a size of the entire screen, based on the position data, and sets a weighted average of the first average luminance and the second average luminance according to the resolution ratio as the average luminance.

11. The display device of claim 10, wherein the position data include at least one of width data of the input image data, height data of the input image data, and a start point of the input image data.

12. The display device of claim 10, wherein the average luminance calculator determines whether the input image data corresponds to the partial screen based on the position data.

13. The display device of claim 10, wherein the image processor further includes:
a first format converter which converts a format of the input image data from a RGB format to a conversion image format which is separated into luminance data and chrominance data; and a second format converter which converts a format of the conversion image data from the conversion image format to the RGB format.

14. A method of image processing, the method comprising:
   calculating an average luminance of a current frame based on a first average luminance of input image data corresponding to a partial screen and a second average luminance of previous image data corresponding to an entire screen, the previous image data stored in a frame memory;
   generating a luminance conversion curve based on the average luminance;
   converting luminance data of the input image data based on the luminance conversion curve and generating conversion image data; and
   generating output image data by merging the conversion image data and the previous image data,
   wherein calculating the average luminance includes:
   receiving position data of the input image data;
   calculating a resolution ratio of the partial screen to the entire screen, which is a ratio of a height of the partial screen to a height of the entire screen, a ratio of a width of the partial screen to a width of the entire screen, or a ratio of a size of the partial screen to a size of the entire screen, based on the position data; and
   setting a weighted average of the first average luminance and the second average luminance according to the resolution ratio as the average luminance.

15. The method of claim 14, wherein the position data include at least one of width data of the input image data, height data of the input image data, and a start point of the input image data.

16. The method of claim 14, further comprising:
   converting a format of the input image data from a RGB format to a conversion image format which is separated into luminance data and chrominance data; and
   converting a format of the conversion image data from the conversion image format to the RGB format.

* * * * *